United States Patent [19]

Arick

[11] 3,955,435
[45] May 11, 1976

[54] VARIABLE SPEED DRIVE MECHANISM

[76] Inventor: Robert E. Arick, 2613 Indiana Ave., Fort Wayne, Ind. 46807

[22] Filed: Oct. 18, 1974

[21] Appl. No.: 515,881

[52] U.S. Cl.................................. 74/411; 74/793; 74/802
[51] Int. Cl.².................. F16H 57/00; F16H 3/44
[58] Field of Search .............. 74/411, 793, 797, 802

[56] References Cited
UNITED STATES PATENTS

| | | | |
|---|---|---|---|
| 1,660,356 | 2/1928 | Postel | 74/793 |
| 2,844,052 | 7/1958 | Stoeckicht | 74/411 X |
| 2,893,268 | 7/1959 | Liebel | 74/411 X |

*Primary Examiner*—John J. Camby
*Attorney, Agent, or Firm*—John A. Young

[57] ABSTRACT

A variable speed drive consisting of a control gear train made up of a central gear which is eccentrically adjustable, an intermeshing walking gear and an overrunning gear form a speed control gear train with the gears connected together by a linkage which includes a hinge connection between the gears. The speed control gear train develops an output speed for the overrunning gear which is a direct function of the degree of the eccentricity of the central gear. The overrunning gear is operatively connected through a second gear train to an output. By controlling the eccentric position of the central gear it is possible, while the gears are running, to control the output speed by simply regulating the eccentric position of the nonrotatable central gear of the speed control gear train. While the gear train is fully operating, the speed control is movable and carrier plate positioned without in any way interfering with gear operation so that the speed of the output shaft is continuously adjustable while the shaft continuously operates. Thus, there is available a complete range of control movement so that the output shaft is movable from static condition through micrometric amounts to full speed and back again while the input shaft can be at any speed and torque.

11 Claims, 7 Drawing Figures

VARIABLE SPEED DRIVE MECHANISM

BACKGROUND OF THE INVENTION

Speed control devices are in common use and the purpose is to determine how much rotational speed and torque shall be communicated from an input shaft to an output shaft. These variously proposed speed drives are generally not adapted for adjustment while the gear train is operating. What is needed, is a speed control drive which is adjustable in micrometric amounts while the drive is operating and with a positive drive between the driving and driven members. For maximum utility, particularly in large presses where it is desired to commence initial operations from a very slow speed, there is needed a positive drive which is possible to adjust by micrometric increments, so that the driving member can communicate its torque and speed to the driven member by small increments and, by continuous adjustment to impart a positive drive force successively increasing the speed from the driving member through the gear train to the driven member.

Ideally, a variable speed drive should have the capability of coupling a source of power to a driven shaft or output and, by adjusting some suitable external means, determine a speed output ranging upwardly from static conditions through micrometric amounts to a preferred upper speed without power loss.

The drive should also be efficient so there is virtually no power loss, or at least minimal loss, in transferring from the power source to the driven member.

The reason these functional requirements are involved is that in many costly machines which may or may not be assembled correctly, it is desirable to go through initial machine movement only very slowly so that when such machines are first tested at low speed, damage can be minimized in the event that there is some kind of malfunctioning.

At the present time there is lacking any satisfactory speed control for carrying out these purposes; therefore, it is one of the objects of the present invention to provide a new and improved speed control drive which is externally adjustable by micrometric amounts so that a power source is adapted for driving an intended machine through an output and such an adjustment will occur by micrometric amounts whereby the speeds are adjustable through infinite increments from static up to an upper limit speed.

There is a further important feature of the present invention is that the torque communicable from the power source to the output shaft or other output means is at a high torque and selected speed.

The variable speed drive of the present invention is also adjustable and has for one of its objects adjustability of torque, speed and synchronization so that the input and output are synchronized one relatively to each other and at the preferred speed, this being the ideal situation whereby one part of a system is related to a second system both in phase and speed according to design and operational parameters.

Other objects and features of the present invention will become apparent from a consideration of the following description which proceeds with reference to the accompanying drawings.

DRAWINGS

Figure 1:
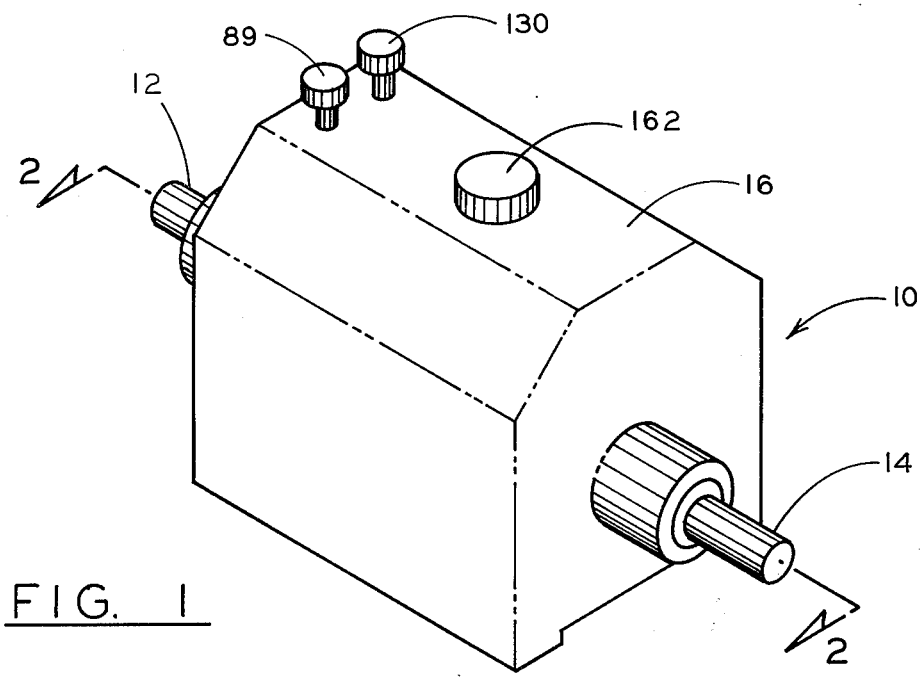
FIG. 1 is an isometric view of a variable speed drive incorporating the present invention.
Figure 2:
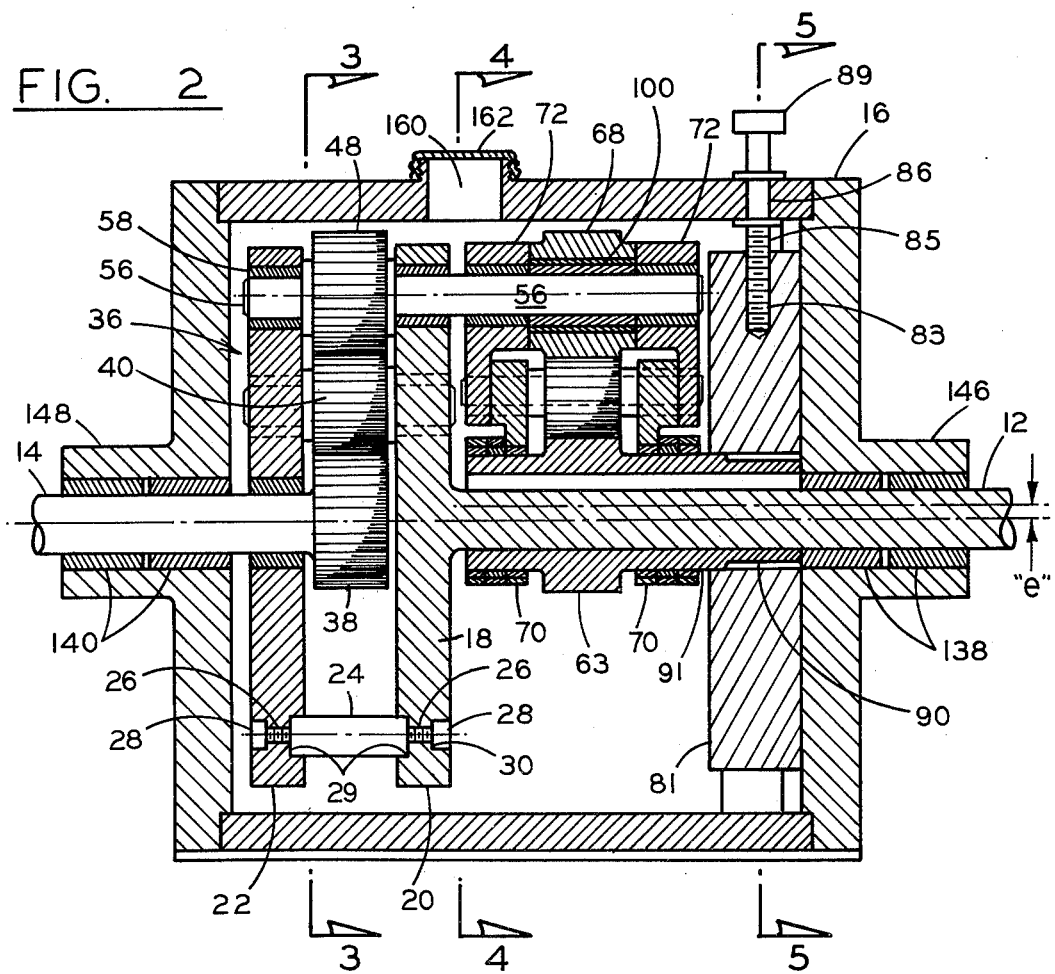
FIG. 2 is a section view taken on line 2—2 of FIG. 1.
Figure 3:
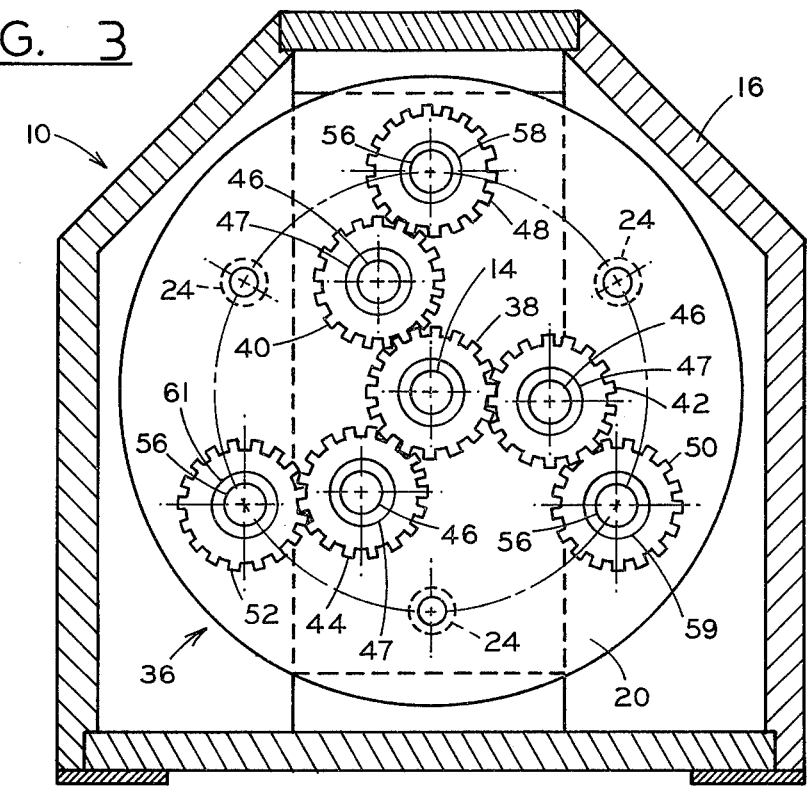
Figure 4:
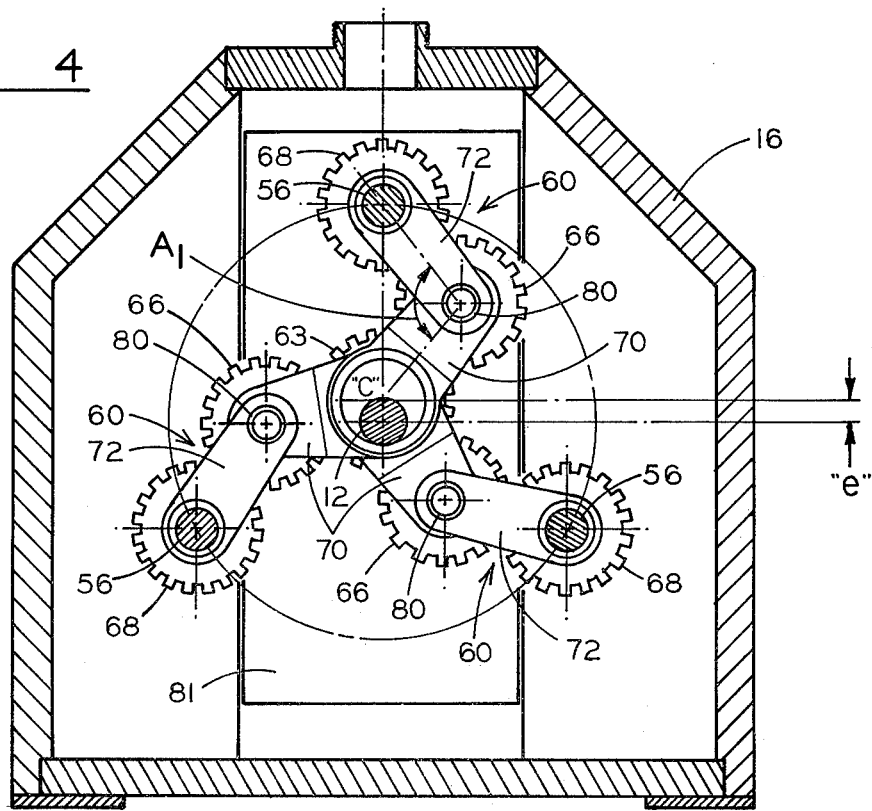
Figure 5:
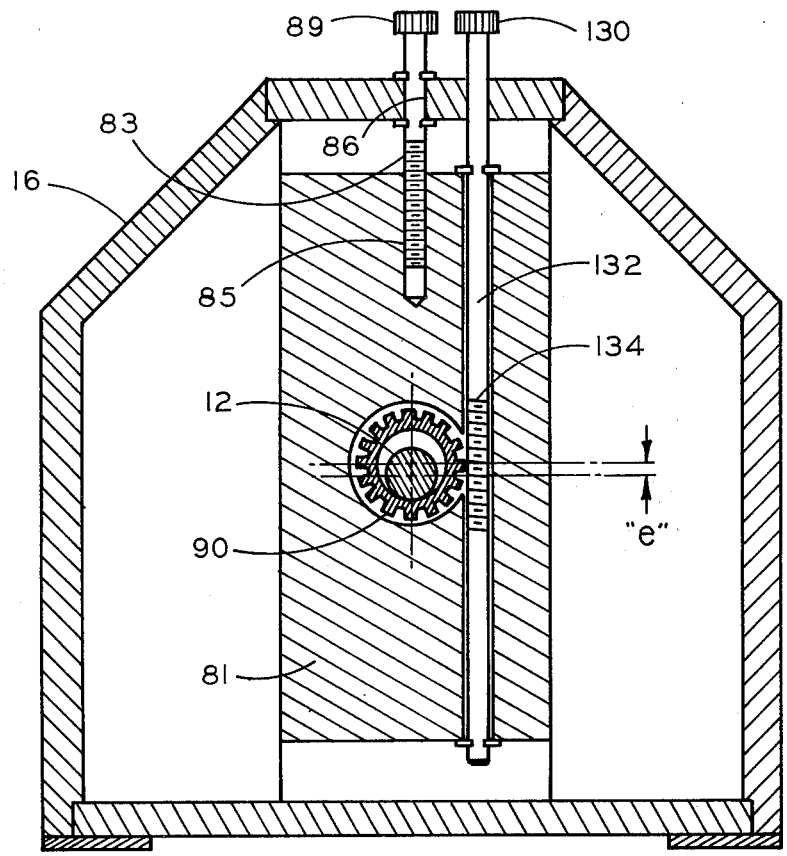
Figure 6:
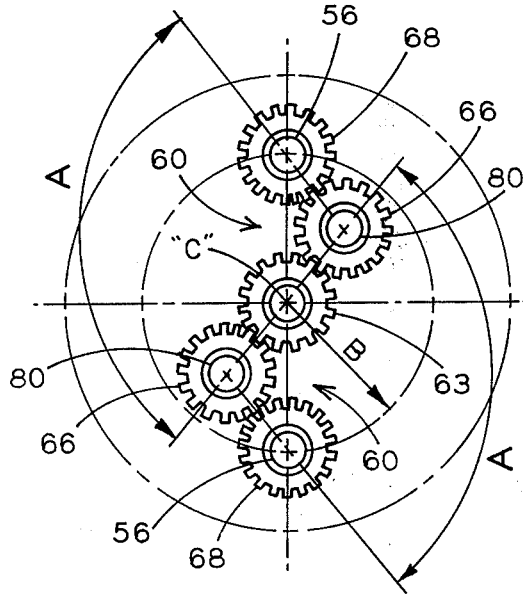
Figure 7:
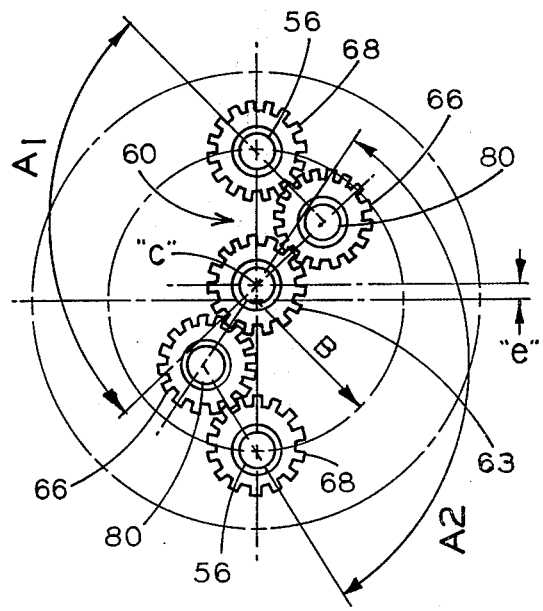

FIGS. 3, 4 and 5 are section views taken on lines 3—3, 4—4 and 5—5 respectively of FIG. 2;

FIG. 6 is a schematic view showing one of the speed control gear trains at "0" output speed position and illustrating the gear train in 180° displacements, with superimposed angles A—A indicating the angular movement of the gear train which determines the output which in this case is 0 output; and FIG. 7 is a schematic view of the same gear train as FIG. 6 but adjusted to effect an output by reason of the central gear being disposed eccentrically so that the linkage will develop changeable angles A1 and A2, the change of angle during a revolution of the speed control gear being productive of an output speed for the output shaft.

DETAILED DESCRIPTION OF THE INVENTION

A variable speed drive mechanism designated generally by reference numeral 10 consists of an input shaft 12 and an output shaft 14. The variable speed drive is housed within a housing 16.

Referring to FIG. 2, the input or power shaft 12 includes a bearing cage 18 comprised of two mounting plates 20, 22 secured together by spaced sleeves 24 with screws 26 having screw heads 28 which are received in recesses 30 and are screwed together to clamp seats 29 against the confronting ends of sleeves 24.

As shown in FIG. 3 there are three spaced sleeves 24, located 120° apart and, which rigidly hold plates 20, 22 together and these serve as the cage for an output gear train designated generally by reference numeral 36 and driving an on-center output gear 38 on the output shaft 14. The caged output gears consist of a set of equidistantly spaced idler gears 40, 42 and 44 (FIG. 3) mounted on shafts 46 in bearing sleeves 47 in plates 20 and 22 respectively and transfer gears 48, 50 and 52 mounted on shafts 56 received in bearing sleeves 58, 59 and 61. Each elongated shaft 56 (FIG. 2) is controlled in speed and direction and its speed, torque and direction are communicated to the output gear train 36 as determined by a speed control train which consists of three co-working trains each designated generally by reference numeral 60 (FIG. 4) and each consisting of centrally disposed fixed gear 63 common to each of the gear trains and eccentrically adjustable as indicated by the letter $e$ (FIG. 4) so that, relative to the axis of the shaft 12, the gear 63 is rotatable either coincidentally or eccentrically relative to the axis of the shaft 12. It is the eccentricity relationship of the gear 63 to the shaft 12 which determines the speed of the output shaft 14.

Since gear 63 is meshed with each of three walking gears 66 (FIG. 4) and gears 66 are meshed with overruning gears 68, the three sets of gears will be caused to rotate and revolve in unison at the center $c$ (FIGS. 6, 7) and such center $c$ is either coincident or eccentrically related to the axis of the shaft 12. The gear 63, the three walking gears 66 and three overruning gears 68 are interrelated by three pairs of linkage arms 70, 72 each pair having articulated connections with the associated central, walking and overruning gears so that the angular relationship between the intersecting lines connecting the centers of the gears 63, 66, 68 determine the rotational speed of overrunning gears 68. For example, referring to FIG. 4, the linkage forms an angle A1 between the lines connecting center of gear 63 and the centers of gears 66 and 68 and as this angle is varied by initial adjustment of central gear 63 or during rotation of the gear train, the output of the overrunning gear 68 will be varied.

The articulated connection 80 permitting flexure of the articulated linkage arms 70, 72 as the three speed control trains 60 rotate about center $c$. When the center $c$ corresponds with the axis of rotation of the shaft 12 (a condition of concentricity) overrunning gears 68 are not rotated nor are the shafts 56. Then transfer gears 48, 50, 52 (FIG. 3) are nonrotatable and output idler gears 40, 42, 44 will simply "walk" around gear 38 on shaft 14 and there will be no output speed of shaft 14. Consequently shaft 14 will remain stationary.

However, if the gear 63 (which as before stated, remains stationary at all times) is moved to be eccentrically disposed relatively to the axis of shaft 12 there will result, depending upon the degree of such eccentricity, a rotation of the output shaft 14.

The stationary gear wheel 63 is positionable to whatever preferred degree of eccentricity is desired by means of a carrier or mounting plate 81 having a screw adjuster 83 with threads 85 through opening 86 externally adjusted by means of knob 89. Carrier 81 positions a gear 90 and sleeve 91, and therefore the gear 63. In so positioning the gear 63, the linkages 70, 72 are likewise positioned relatively to their articulated connections with gear wheels 63, 66, 68 (FIG. 4). When there is a degree of eccentricity in location of gear 63 relative to axis of rotation of shaft 12, the links 70, 72 will flex during revolutions of the gear train 60 as indicated in FIGS. 6 and 7 as said gear train 60 revolves about the center $c$. During 180° of such movement, the overrunning gear 68 will rotate in one direction and during the second 180° movement the overrunning gear 68 will counterrotate, the counterrotation being accommodated by means of overrunning clutches 100.

Referring to FIGS. 6 and 7, during the first 180° movement of the speed control train (only one train being shown in displaced 180° positions) in the concentric position (FIG. 6), the overrunning gear 68 will be nonrotated by walking gear 66 when center gear 63 is concentric to the axis of rotation of shaft 12 and the transfer gear is nonrotating so that the output idler gears 40 walk around output gear 38 and the shaft 14 remains stationary. However, as indicated in FIG. 7, when the gear 63 is disposed eccentrically relative to the center of shaft 12, the links 70, 72 (FIG. 4) will progressively close and then open when gear 63 is eccentrically disposed and the closing and opening movements produce a variable speed and direction for gears 68 which will rotate and counterrotate each successive 180° movement as the gear trains 60 revolve. The eccentric positioning of fixed gear 63 causes flexure of links 70, 72 about 80 and variably rotates gears 68. Depending upon which of the gears 68 is moving the fastest, the rotating speed and torque is communicated through the associated output shaft 56 to the associated transfer gear 48 the output idler 40 and the output gear 38 connected to output shaft 14.

When it is desired to synchronize shaft 12 and shaft 14 the knob 130 (FIG. 5) is turned to rotate shaft 132 having a worm 134 which is meshed with worm wheel 90 to position the normally nonrotatable gear 63 through sleeve 91 and adjustably dispose gear 63 relative to gear 38 and thereby effecting the desired synchronization of shaft 12 with shaft 14. As shown in FIG. 2, the input shaft 12 and output shaft 14 are supported by bearing sleeves 138 and 140 in reduced diameter bosses 146 and 148 respectively.

The casing interior is accessed through opening 160 with a cap 162.

OPERATION

In operation, the knob 89 positions the carrier plate 81 and gear 63 so that the center of the gear 63 is disposed either concentrically or at whatever degree of eccentricity is desired relative to the axis of shaft 12.

When the shaft 12 rotates, it also rotates the entire cage 18 together with output idler gears 40, 42 and 44 and transfer gears 48, 50 and 52 (FIG. 3) and the entire output gear system will react through overruning gears 68 and walking gears 66 to fixed gear 63.

If the knob 89 has been adjusted so that carrier 81 and nonrotatable control center gear 63 are eccentrically disposed, the gear 63 which is the reaction gear against which all of the gears react, will cause the speed control gear trains 63 (FIG. 4) to flex the linkages 70, 72 as the speed control trains revolve about the eccentric center and thus cause at least one of the transfer gears 68 at all times to rotate at such a speed that one of the overruning gears 68 will rotate and associated transfer gears 48, 50 and 52 and an associated idler output gear 40, 42 and 44 will effect rotation of gear 38 and its attached output shaft 14. The degree of rotation is directly related to the amount of eccentricity in positioning of the gear 63.

While the gear train is fully operating, the speed control 89 is movable and carrier plate 81 positioned without in any way interfering with gear operation so that the speed of the output shaft 14, as previously described, is continuously adjustable while the shaft 12 continuously operates. Thus, there is available a complete range of control movement so that the output shaft 14 is movable from static condition through micrometric amounts to full speed and back again while the input shaft 12 can be at any speed and torque.

Although the present invention has been illustrated and described in connection with a single example embodiment, it will be understood that the selected embodiment is illustrative of the invention and is by no means restrictive thereof. It is reasonably to be expected that those skilled in this art can make numerous revisions and adaptations of the invention and is intended that such revisions and adaptations will be included in the scope of the following claims as equivalents of the invention.

What I claim is:

1. A speed control device comprising an input driving member, an output driven member, and a linkage therebetween including a first gear and an intermeshing second gear on said input and output members respectively, and means operatively controlling the ratio of rotatable and revolvable speed of said second gear relatively to said first gear during a combination of rotational and revolvable movement of said second gear, at least one set of three interconnecting gears one of which is fixed and is eccentrically mounted and including a hinged arm interconnecting said set gears whereby the rate of rotation and direction of the intermediate and outer gear of said set is determined by the degree of eccentricity of the fixed one of said gears from the center of rotation of said first gear, and means forming an operative connection between the said set of gears and the said first gear whereby the degree of eccentricity controls the speed of said output driven member, and means for operatively adjusting said eccentricity both during static and non-static conditions of said gears.

2. An input power means and an output power means having as a speed control at least one set of three gears having an operatively interconnecting linkage, said linkage means and the attached gears being operatively adjustable to determine the angular relationship of the three gears of said set through said linkage gears thereby determining the rate of rotation and revolution of said gear train, and a transfer gear means forming a drive connection between said input means and said output means and interconnected with said gear set to regulate the speed between said input power means and said output power means.

3. The variable speed drive in accordance with claim 2 including mounting means for radially adjusting the radially inner gear of said gear set to a position either coincident with or eccentric to the center of rotation of the output power means and means for adjusting the position of said mounting means by micrometric amounts to adjustably determine the angular relation of said gear set and thereby controlling the output speed of said output power means.

4. The variable speed drive in accordance with claim 3 including a clutch forming a connection between said transfer gear means and said gear train whereby the output gear train is effective for rotating the power means in one direction only.

5. The variable speed drive in accordance with claim 3 including phase adjusting means for controlling one of the gears of said gear train to determine the phase relationship of said input power means and said output power means.

6. A variable speed drive comprising an input shaft, a gear cage operatively connected with said input shaft and including at least one set of intermeshing gears mounted therein, an output shaft having an output gear operatively connected to said set carried by said cage and having a drivable connection therewith and at least one set of speed control gears having operatively connecting linkage means and an eccentrically adjustable center gear, a walking gear and an overrunning gear operatively connected to said intermeshing gears, said speed control gear linkages permitting opening and closing of said linkage whereby the rotational speed of said overrunning gear is determined by the degree of eccentricity and angular position of said overrunning gear in one direction only whereby said overrunning gear effects movement of the output shaft in only one direction through said intermeshing and gears operatively driving said output shaft.

7. The variable speed drive in accordance with claim 6 including a carrier for said speed control gear train and operatively carrying the eccentrically movable center gear, and means for disposing said carrier by micrometric eccentric amounts to determine the range of speed of said output means from 0 speed by incremental amounts to an upper limit speed.

8. The variable speed drive in accordance with claim 6 including means for positioning the eccentrically adjustable center gear circumferentially to determine the synchronization of said input and output means respectively.

9. A process for controlling the communication of speed between driving and driven members comprising the steps of coupling the input driving member and the output driven member through a gear system, and imposing upon at least certain of the gear members an eccentric or concentric gear position to control the ratio of output to input speed as a function of such eccentrically located positions.

10. The process in accordance with claim 9 including the step of micrometrically adjusting the eccentrically disposed position of at least certain of said gears while the input gear member is operating at full speed and torque to effect controllable coupling between the input and output members respectively as a function of such adjustment.

11. The process in accordance with claim 9 comprising the steps of synchronizing the input and output members by effecting an initial angular position of the gear members respectively.

* * * * *